United States Patent [19]

Moller et al.

[11] E Re. 30,963

[45] Reissued Jun. 8, 1982

[54] ATOMIZER WHEEL WITH WEAR-RESISTANT, SINTERED BUSHINGS

[75] Inventors: Aage Moller, Farum; Oria Straarup, Birkerod, both of Denmark

[73] Assignee: Aktieselskabet Niro Atomizer, Soborg, Denmark

[21] Appl. No.: 895,529

[22] Filed: Apr. 11, 1978

Related U.S. Patent Documents

Reissue of:

[64] Patent No.: 3,640,467
Issued: Feb. 8, 1972
Appl. No.: 871,925
Filed: Oct. 28, 1969

[30] Foreign Application Priority Data

Nov. 5, 1968 [DK] Denmark ..... 5367/68

[51] Int. Cl.[2] ..... B05B 3/10
[52] U.S. Cl. ..... 239/224; 233/46
[58] Field of Search ..... 239/222.11, 223, 224, 239/222; 233/46, 47 R

[56] References Cited

U.S. PATENT DOCUMENTS

| | | | |
|---|---|---|---|
| 2,060,239 | 11/1936 | Peltzer | 233/47 R |
| 2,695,748 | 11/1954 | Millard | 233/47 R |
| 3,108,952 | 10/1963 | Antz | 233/46 X |
| 3,228,598 | 1/1966 | Keith, Jr. | 233/47 R X |
| 3,454,226 | 7/1969 | Nielsen | 239/224 |
| 3,520,473 | 7/1970 | Gilreath | 233/47 R |

OTHER PUBLICATIONS

Drawing n-8452C from Western Precipitation Cor., 7-5-46.

Drawing-13748B from Western Precipitation Cor., 3-3-40.

Drawing n-1076-B1 from Western Precipitation Cor., 5-18-42.

Drawing n-8453-A4 from Western Precipitation Cor., 3-19-45.

*Primary Examiner*—Andres Kashnikow
*Attorney, Agent, or Firm*—Stevens, Davis, Miller & Mosher

[57] ABSTRACT

An atomizer wheel for the atomization of dispersions of very highly wearing materials for example a caoline dispersion, said wheel comprising an annular bowl-shaped space defined by a hub, a cylindrical wall concentrically surrounding the hub, and a bottom part connecting said hub and said wall. The wall is provided with a number of holes lined with bushings of a highly wearproof sintered material embedded in cylindrical bushings of a material able to resist tensile stresses such as steel or plastic, said cylindrical bushings fitting loosely in the holes and abutting at their outer end an inwardly projecting edge of the holes and with their inner ends projecting a distance into the annular space.

7 Claims, 2 Drawing Figures

ATOMIZER WHEEL WITH WEAR-RESISTANT, SINTERED BUSHINGS

Figure 1:
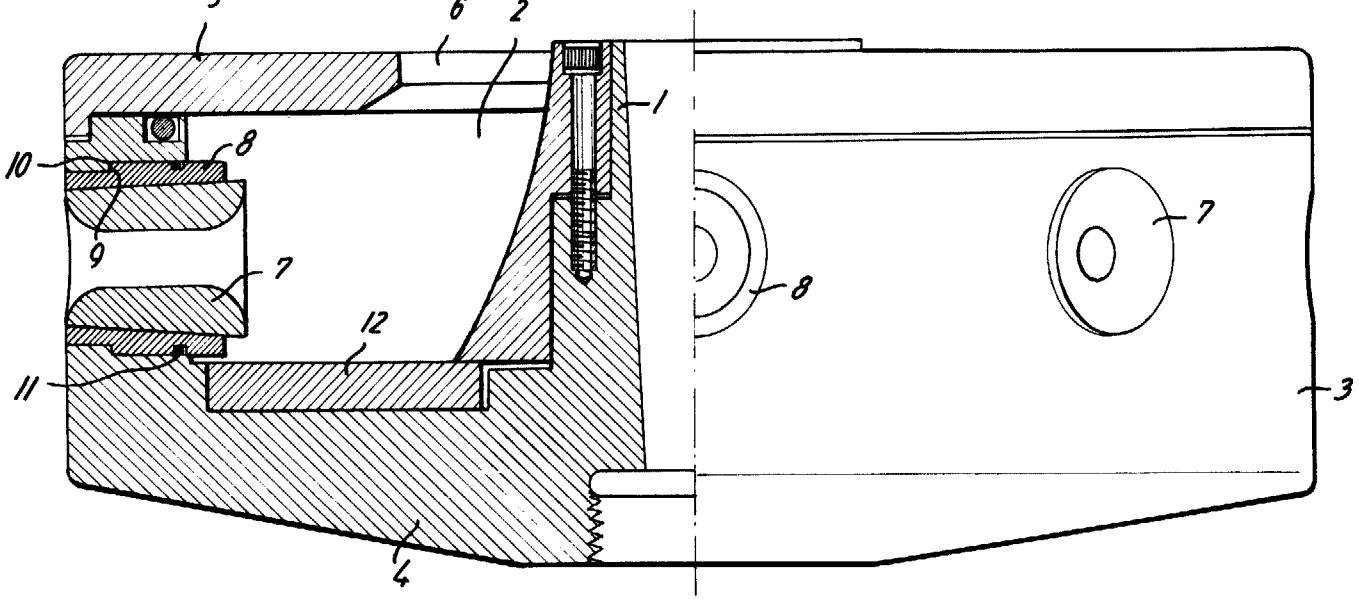

Matter enclosed in heavy brackets [ ] appears in the original patent but forms no part of this reissue specification; matter printed in italics indicates the additions made by reissue.

This invention relates to an atomizer wheel for the atomization of slurries of highly abrasive material, of the kind which has, concentrically around the hub of the wheel, an annular bowl-shaped space, the essentially cylindrical outer wall of which has a plurality of cylindrical ejection apertures which have bushing-shaped linings of wear-resistant sintered material.

The said linings of sintered material are used when the wheel is employed for the atomization of slurries of highly abrasive material, such as ceramic clay, in spray drying of dispersions thereof.

Considerable difficulties are entailed in the fitting of the linings due to the fact that the material of the linings only tolerates compressive stresses and, to all intents and purposes, does not tolerate tensile or bending stresses.

In order to obtain a practically pure compressive stress, it has been proposed for example in the assignee's prior U.S. Pat. No. 3,454,226 to employ linings of a conical shape which are inserted into conical holes. It is then possible to keep the linings clamped in the holes with the aid of the centrifugal [fore] *force.*

However, it has proven that great difficulties attend the removal of the linings after a period of time, for instance, when they are to be changed or turned on account of wear. It so happens that the great centrifugal forces occuring during the use of the wheel have the effect of the lining being compressed so hard into the conical holes that it is possible to remove them only with the greatest of difficulty.

Another disadvantage which occurs with both conical and cylindrical linings or linings of another shape, is that the cylindrical wall of the wheel is elastically deformed due to the action of the centrifugal force so that the holes change shape during operation. Thus, a cylindrical or conical hole having a circular cross section will acquire an elliptical cross section during the rotation of the wheel. This manifests itself by the formation of cracks in the linings, especially in planes which lie at right angles to or through the axis of the wheel, respectively.

This often leads to the linings having to be discarded before they are too badly worn.

The characteristic feature of the present invention is that the [lining] *linings* are mounted in bushings of a material which is resistant to tensile stresses, said bushings being cylindrical and having an outer diameter which is slightly smaller than the corresponding cylindrical apertures in the outer wall, and having a shoulder turning towards the outermost end, which abuts an inwardly projecting edge in the apertures.

Since the bushing is fitting relatively loosely in the [aperature] *aperture* in the wheel, the deformation of the cross section shape of the aperture due to the action of the centrifugal force, does not result in any deformation of the bushing. The bushing is also subjected to the action of the centrifugal force, which may possibly result in a certain change in its dimensions, but its cross section remains cylindrical as a consequence of the symmetry. Consequently, the only thing which will occur is a rise in the compression of the sintered lining, but no tensile or bending stresses will occur, such as do appear when the cross section is deformed around a tightly fitting lining inserted directly into the aperture in the wall of the wheel.

The bushings may be of any desired material which is capable of resisting the influences to which it is exposed during the operation of the wheel, e.g., steel or a suitable plastic polymer material.

In the following, the invention is explained in greater detail with reference to the drawing, in which FIG. 1 shows an embodiment of the atomizer wheel according to the invention seen in section, and FIG. 2 a modified embodiment of a lining for the ejection aperture of such an atomizer wheel.

The wheel shown in FIG. 1 has, by and large, the form of a bowl with a centrally disposed hub 1, by means of which an annular space 2 is formed between the hub 1 and the outer wall 3 of the wheel and is, moreover, defined by the part 4 of the wheel connecting the hub 1 and the outer wall 3, which forms the bottom of the annular space. Furthermore, on the upper side of the wheel an annular cover plate 5 is screwed on, surrounding the hub 1 in such a way that between it and the annular plate 5 an annular aperture 6 is formed into the space 2.

The wheel is intended to be fitted in an atomization device, in which it is mounted on a shaft which, during operation, rotates at a very high speed. A slurry is supplied via the aperture 6 to the space *and* is ejected, in an atomized form through the ejection apertures in the sidewall 3 into a surrounding drying chamber, in which the fine particles formed by atomization are dried, so that their content of solid matter drops on to the bottom of the drying chamber in the form of a fine powder.

In FIG. 1 a single one of these apertures is to be seen, and according to the invention, a lining 7 of wear-resistant, sintered material, e.g., tungsten carbide, silicone carbide, aluminum oxide or tetraboric carbide, is mounted.

The lining 7 shown has a conical outer surface and is inserted into a bushing 8 which on the inside is correspondingly conical. The lining 7 has an outwardly decreasing diameter and during the rotation of the wheel it will, therefore, due to the centrifugal force, be strongly compressed into the bushing 8 and will thereby remain firm. The bushing 8 is cylindrical with a shoulder 9 which turns outwards and is in abutment with an inwardly turning edge 10 in the ejection aperture. The fit of the bushing in the aperture is loose but is kept firm during the rotation on account of the centrifugal force by means of the abutment of the shoulder 9 against the edge 10. In order to achieve sealing between the bushing 8 and the aperture in the wall 3, a sealing ring 11 is inserted in a groove in the bushing 8.

The bushing 8 and the lining 7 are polished smooth externally flush with the outside of the wall 3, but the bushing is somewhat longer than the thickness of wall 3, so that same extends a little into the space. Moreover, the lining 7 is somewhat longer than the bushing 8 and consequently extends a bit further in than same.

When the wheel is rotating, the centrifugal force brings about an increase in the diameter of the cylindrical wall 3. This has the effect that an aperture in the wall with circular cross section is deformed in such a way that the cross section becomes elliptical, since a diameter in a normal plane in the cylindrical wall 3 becomes bigger than when standing still, while a diameter in a plane through the axis of rotation is not increased. When a conical lining of sintered material is inserted directly into a conical aperture in the wall 3 and is compressed tightly into same on account of the centrifugal force, the deformations occurring during the starting and stopping of the wheel will within a short period of time result in the formation of cracks. This does not happen, however, when the conical lining is inserted into the bushing, as shown in the drawing, when it fits sufficiently loosely in the aperture, and thus does not transfer the deformation of the aperture to the bushing. The lining is compressed tightly into the bushing on account of the centrifugal force, however, all circular cross sections remain circular, so that the stresses which these produce on the sintered lining 7 are pure pressure [stressed] *stresses*, and consequently, no danger of crack formation exists.

On account of the conicity, the lining 7 will within a short period of time, due to the action of the centrifugal force, press itself firmly into the bushing 8 so that they are inseparable. During operation, the bushing 8 sits equally firmly on account of the centrifugal force, however, as soon as the wheel stops, it is possible to easily remove the bushing 8 together with the lining 7 due to the cylindrical loosely fitting shape. No difficulties are encountered in removing the bushings in the wheel either with turning them or replacing them with others.

On account of the bushing 8 extending somewhat into the space 2 and the lining 7 extending somewhat more into the space, solid material from the slurry is going to deposit during the operation of the wheel, which material completely covers the joint surfaces between the lining 7 and the bushing 8, as well as the ones between the bushing 8 and the wall 3, so that harmful wear and tear on these places is avoided in a corresponding manner as described in U.S. Pat. No. 3,454,226.

The wear on the bottom of the space 2 is obviated in the same way as stated in the said patent in that a flat ring 12 of wear-resistant, sintered material is clamped there covering the bottom.

Figure 2:
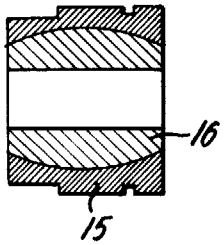

FIG. 2 shows a modified embodiments of the bushing with lining.

The bushing, which in FIG. 2 is marked with 15, possesses the same external shape as the bushing 8 in FIG. 1, but as distinct from this it is manufactured by being molded around the lining which is designated 16.

The lining 16, in the embodiment shown, possesses the shape of a body of revolution with an elliptical generatrix, so that it acquires a convex external surface, by means of which it comes to rest immovably firm in the bushing 5. It is also possible to employ other shapes for the generatrix, as it is merely, on the one hand, to meet the demand that the shape is to be of such a kind that it will be impossible for the lining to be ejected from the bushing during operation on account of the centrifugal force, and on the other hand, that the divergence from the cylindrical shape is not of the kind which would involve the risk of a fracture arising from the centrifugal force.

The molding of the bushing 15 may be carried out in such a way that by means of the cooling a prestressing is produced which, on the one hand, ensures that the lining 16 rests [immovable] *immovably* firm, and on the other hand, subjects same to such a pressure effect that it is better able to resist tensile stresses as may be produced due to the action of the centrifugal force.

What we claim is:

1. In an atomizer wheel for atomization of slurries of highly abrasive materials having a bowl-shaped wheel with a cylindrical outer wall and a plurality of ejection openings disposed in said outer wall distributed around the circumference thereof, each said opening having its axis in a radial direction, and a lining, said lining having a first bushing constituting the sole defining path for exhausting slurry and made of a sintered wear-resistant material with a conical outer surface, wherein the improvement comprises a second bushing fitted over said first bushing, said second bushing having an outside diameter small enough to define a clearance fit with said opening so that it will remain circular even if the opening is deformed when running, *said first and second bushings both extending into the bowl of said wheel;*

*a sealing ring between said second bushing and its respective opening at a location adjacent the outer wall of said bowl;* said second bushing being provided with shoulder means *on the outer surface thereof in its region radially outwardly of said sealing ring* so as to be rotatable to positions throughout 360° to compensate for wear, said shoulder means engaging an inwardly extending edge of said opening and constituting the sole means preventing outward movement of said bushing from said opening but permitting free inward movement for easy removal or adjustment thereof[.], *said first bushings extend a distance outside said second bushings at the inwardly turned ends of same.*

2. An atomizer wheel as claimed in claim 1, wherein said second bushings are of steel.

3. An atomizer wheel as claimed in claim 1, wherein said second bushings are of a plastic polymer material.

4. An atomizer wheel as claimed in claim 1, wherein said first bushings are conical and in that said second bushings possess a corresponding internal conicity.

[5. An atomizer wheel as claimed in claim 1, wherein said first bushings extend a distance outside said second bushings at the inwardly turned ends of same.]

[6. An atomizer wheel as claimed in claim 1, wherein said first bushings are shaped as bodies of revolution which over at least part of their length are of convex generatrices, and are molded into said second bushings.]

[7. An atomizer wheel as claimed in claim 6, wherein said first bushings are molded into said second bushings with prestressing.]

8. An atomizer wheel as claimed in claim 1, wherein said second bushings extend a distance into said [annular space] *bowl.*

*9. In an atomizer wheel for atomization of slurries of highly abrasive materials having: a bowl-shaped wheel with a central hub and a cylindrical outer wall coaxially disposed about said hub and a bottom part connecting said outer wall with said hub to define an annular chamber; an annular cover member on said outer wall, said cover member having a central opening defining together with said hub an unobstructed space in communication with said annular chamber; a plurality of ejection openings disposed in said outer wall distributed around the circumference thereof, each said opening having its axis in a radial direction, and a lining, said lining having a first bushing with its inner end projecting into said annular chamber; said first bushing constituting the sole defining path for exhausting slurry and made of a sintered wear resistant material with*

*a conical outer surface, wherein the improvement comprises*

*a second bushing fitted over said first bushing, said second bushing having an outside diameter small enough to define a clearance fit with said opening so that it will remain circular even if the opening is deformed when running, and a sealing ring around the outer circumference of the second bushing at a location adjacent the outer wall of said annular chamber to prevent escape of slurry into the clearance fit space between the second bushing and the opening into which it is inserted;*

*said second bushing being provided with shoulder means on the outer surface thereof in its region radially outwardly of said sealing ring so as to be rotatable to positions throughout 360° to compensate for wear, said shoulder means engaging an inwardly extending edge of said opening and constituting the sole means preventing outward movement of said bushing from said opening but permitting free inward movement for easy removal or adjustment thereof.*

*10. An atomizer wheel for abrasive slurry comprising a hub, a cylindrical outer wall coaxially disposed about said hub and a bottom wall connecting said outer wall and said hub to define between them an annular chamber; a ring shaped cover on said outer wall having a central opening, said opening defining together with said hub an unobstructed space in communication with said annular chamber; a plurality of cylindrical ejection apertures extending through said outer wall and uniformly distributed around the circumference thereof, each said aperture having its length running in the radial direction of the wheel and an inwardly turned abutment edge along that length but spaced between the ends thereof; a bushing in said aperture having a corresponding outwardly turned abutment edge abutting said inwardly turned edge, the bushing having a smaller diameter than the corresponding diameter of the aperture in which it is fitted so as to define a clearance fit therein and to be freely rotatable therein throughout 360°, with the abutting edges constituting the sole means preventing outward movement of the bushing from the aperture but permitting inward movement for easy removal; a sealing ring between the bushing and the aperture positioned adjacent the outer wall of the annular chamber and radially inwardly of said abutment edge, said sealing ring preventing the escape of slurry to the clearance fit space between the bushing and the aperture; said bushing having an inner opening with a conical shape, a lining of sintered wear resistant material within said inner opening, said lining having a conical outer surface corresponding to the conical inner surface of the bushing, the outside end of the lining being approximately flush with the outer surface of the outer wall and the inside end of the lining of sintered material projecting into said annular chamber by a distance sufficient to cause accummulation on the outer wall of a layer of solid material from the slurry between adjacent linings so as to avoid harmful wear of the outer wall by the abrasive slurry rotating within the chamber.*

* * * * *